US011511939B2

(12) United States Patent
Wüste et al.

(10) Patent No.: US 11,511,939 B2
(45) Date of Patent: Nov. 29, 2022

(54) MAGAZINE FOR STORING FASTENERS AND SIMILAR OBJECTS

(71) Applicant: Altas Copco IAS GmbH, Bretten-Goelshausen (DE)

(72) Inventors: Michael Wüste, Wesel (DE); Daniel Burmeister, Munich (DE)

(73) Assignee: Atlas Copco IAS GmbH, Bretten-Goelshausen (DE)

( * ) Notice: Subject to any disclaimer, the term of this patent is extended or adjusted under 35 U.S.C. 154(b) by 478 days.

(21) Appl. No.: 16/697,783

(22) Filed: Nov. 27, 2019

(65) Prior Publication Data

US 2020/0172340 A1 Jun. 4, 2020

(30) Foreign Application Priority Data

Nov. 29, 2018 (DE) .......................... 102018130317.3

(51) Int. Cl.
| | | |
|---|---|---|
| *B65G 11/06* | (2006.01) | |
| *B23P 19/00* | (2006.01) | |
| *B25B 23/06* | (2006.01) | |
| *B65G 1/04* | (2006.01) | |
| *B65G 19/02* | (2006.01) | |

(52) U.S. Cl.
CPC .......... *B65G 11/063* (2013.01); *B23P 19/002* (2013.01); *B23P 19/003* (2013.01); *B25B 23/06* (2013.01); *B65G 1/045* (2013.01); *B65G 19/02* (2013.01); *B65G 2201/0217* (2013.01)

(58) Field of Classification Search
CPC ........ B65G 47/06; B65G 47/08; B65G 19/02; B65G 19/282; B65G 11/20; B65G 1/045; B65G 47/5136; B65G 47/5177; B65G 2201/0217; B25B 23/06; B25B 23/065; B65D 83/02; B65D 85/24; B23P 19/002; B23P 19/003
See application file for complete search history.

(56) References Cited

U.S. PATENT DOCUMENTS 1,750,310 A     3/1930    Jonkel et al.
2,878,915 A *   3/1959    Judge ................... H05K 13/029
                                                                                             29/463

(Continued)

FOREIGN PATENT DOCUMENTS

| CH | 367753 A | 2/1963 |
|---|---|---|
| EP | 3153438 A1 | 4/2017 |
| GB | 2224997 A | 5/1990 |

OTHER PUBLICATIONS

EP 19206927.6 extended European search report dated Apr. 3, 2020.

*Primary Examiner* — Mark A Deuble
(74) *Attorney, Agent, or Firm* — The Culbertson Group, P.C.

(57) ABSTRACT

A magazine for storing elements which each have a shaft and a head. The magazine includes a cylinder defining a shell surface in which is formed a helical-shaped groove. The shaft of each element to be stored can be inserted into the groove while the head of each element protrudes outward radially over the groove. The head of each element can be impacted in the peripheral direction by a suitable carrier in order to move the elements through the groove one after the other to an outlet end of the groove where the elements are ejected individually.

13 Claims, 2 Drawing Sheets

(56) References Cited

U.S. PATENT DOCUMENTS

| | | | | |
|---|---|---|---|---|
| 4,480,382 A | * | 11/1984 | Haigh | B65G 47/06 |
| | | | | 29/786 |
| 4,501,380 A | | 2/1985 | Welch | |
| 4,889,259 A | * | 12/1989 | Lowrance | E21B 33/068 |
| | | | | 29/889 |
| 5,297,668 A | * | 3/1994 | Zink | B65G 33/04 |
| | | | | 198/860.4 |
| 5,568,850 A | | 10/1996 | Neber | |
| 6,092,641 A | * | 7/2000 | Draghetti | B65G 33/04 |
| | | | | 198/417 |
| 6,149,378 A | * | 11/2000 | Biondi | B65G 47/28 |
| | | | | 414/795.1 |
| 6,364,088 B1 | | 4/2002 | Steffens et al. | |
| 9,051,124 B2 | * | 6/2015 | Buchhauser | B65G 21/18 |
| 9,511,416 B2 | * | 12/2016 | Godfrey | B21J 15/105 |
| 2004/0195076 A1 | * | 10/2004 | Monti | B65G 33/04 |
| | | | | 198/459.4 |

* cited by examiner

MAGAZINE FOR STORING FASTENERS AND SIMILAR OBJECTS

TECHNICAL FIELD OF THE INVENTION

The present invention relates to a magazine for storing like elements featuring a shaft and a head. This includes screws, in particular flow drill screws, but also other fasteners or general elements with a shaft and attached head. Any such device including a shaft and a head will generally be referred to in this disclosure and accompanying claims simply as an "element," or in the plural as "elements."

BACKGROUND OF THE INVENTION

For industrial manufacturing processes in which elements are used or installed, it is generally required that these elements are provided individually and in a specified direction. Already known are magazines that contain elements prepositioned by row and column in a matrix-like, flat grid. Multiple overlapping arrangements of this type can form a (three-dimensional) magazine.

There are difficulties here with the size of these prior art magazines because it is advantageous for as many elements as possible to be housed in a narrow space. At the same time, the magazine should be easy to handle. It is preferred that a magazine for holding elements is located close to the processing machine using the elements, with different spatial orientations (tilted position) must be possible. Accordingly, it must be ensured that the elements placed in the magazine are held there securely and cannot fall out. Finally, loading and unloading the magazine should be simple and most of all fast in order to rapidly carry out the manufacturing process and avoid downtime.

SUMMARY OF THE INVENTION

An object of the present invention is to provide magazines for holding elements and processes for using such magazines which overcome the above-described disadvantages and others.

This object is achieved by storing a number of elements together in a spatial alignment in a groove in which the elements are arranged in a row horizontally. In these arrangements, an element can be transported in the groove with suitable means to an outlet end of the groove where the element can be removed or ejected from the magazine in order to feed it in to a processing machine or other destination.

A groove in which elements are stored in accordance with the present invention may have a helical-shaped contour in the shell surface of a cylinder, so that the groove, originating from a groove starting end, rotates around the rotation axis of the cylinder in multiple loops one after the other in the axial direction in a helical shape to the groove outlet end. This advantageously minimizes the installation space for the magazine. The elements are thereby placed in the groove with their shaft so that they completely or at least predominantly extend into the groove or the inside of the cylinder. The width of the groove is selected for this purpose such that the shaft of every element can extend into the groove, but with the respective head being wider than the groove such that the head of the element remains outside of the cylinder shell surface in which the groove is located. The radial depth of the groove may be selected such that the shaft of each element can completely extend into the groove in a radial direction until the bottom of the respective head is resting on the cylinder shell surface on both sides of the edges of the groove.

In a magazine according to the present invention including a helical groove, the elements can be arranged one after the other in a helical shape such that the shaft of the respective element is directed to the interior of the cylinder, preferably so that the longitudinal axis of the shaft intersects the rotational axis of the cylindrical shape in which the helical groove is located.

Individual elements may be removed from the groove with a suitable means of gripping. Alternatively, elements may be pushed further inside the groove toward the outlet end with a suitable means of pushing so they are available one after the other at the outlet end of the groove and can be ejected or removed there.

In some embodiments of the invention, at least one drivable carrier is provided, which in terms of conveying relative to the cylinder can move around the shell surface in a peripheral direction. One element is always impacted or conveyed on its way along the groove to the end of the groove by the same carrier. The carrier thereby brushes over the shell surface of the cylinder and contacts the heads extending out of the groove (or possibly sections of the shafts projecting outward radially from the groove) in a peripheral direction with a feed force. The elements contacted in a peripheral direction are further moved or conveyed along the groove as a result, and automatically reach the outlet end of the groove one after another. This movement can be created by the carrier essentially remaining in a fixed location and the cylinder turning on its rotational axis. Alternatively, the cylinder may remain essentially stationary or at least does not rotate while at least one carrier rotates around the shell surface. The advantage of this latter variation is that the outlet end of the groove does not change position while the elements are conveyed through the groove. If the cylinder rotates instead with an essentially fixed carrier, then the end of the groove moves around the rotational axis of the cylinder and the output location for the elements defined by the outlet end of the groove is changeable.

Some embodiments of the invention provide that a number (n) of various carriers, preferably uniform carriers, are arranged around the shell surface. The carriers form a type of rake or cage. The carriers forming the cage rotate around the rotational axis of the cylinder so that all carriers arranged around the cylinder cover the surface of the shell at the same time. This homogenizes the forward feed over the circumference. In addition, the elements sitting in the groove are divided by multiple carriers into smaller groups with few, preferably only one, elements each, which simplifies the dosing on the outlet end of the groove.

In these embodiments having a cage of carriers, the distance between two adjacent carriers of the cage in the peripheral direction (more precisely, in the longitudinal direction of the groove) can be selected so that a defined number of elements is arranged between the adjacent carriers in the groove. For example, three elements may reside in the groove surrounded by a preceding carrier and following carrier in the peripheral direction. A reasonably precise sizing and positioning of the carrier relative to the elements sitting in the groove allows for an exact guiding or positioning of the elements, in particular for the further conveyance by rotating the cage of carriers.

In some embodiments of the invention, only one element is located between two adjacent carriers of the cage in the peripheral direction. An advantage of these embodiments is that the individual elements in the peripheral direction are all the same distance from each other. As a result, a timed transport of the elements (as discussed further below) can take place using the movement of the cage of carriers at a constant angle of rotation.

The distance between two adjacent carriers in the peripheral direction may be chosen so that exactly one element head moves between them. This is suitable for an application in which the elements fully protrude with their shaft into the groove so that only the head extends over it and rests on the shell surface. Two adjacent carriers surround the head in the peripheral direction wherein the "rear" carrier in the direction of the rotation laterally impacts the head of the respective element while sweeping over the shell surface and moving the affected element along the groove.

In some embodiments the peripheral distance to the carrier may be less than the diameter of an element head, namely, more on the scale of a shaft diameter of an element. This arrangement is suitable when a portion of the element shaft extends radially outward beyond the groove and the carrier is designed such that it is movable radially inside and outside of the shaft head against this protruding shaft section. Then it is not the head of the respective element, but rather the shaft that is laterally impacted while the element head protrudes so far radially to the outside over the shell surface that the carrier can grasp it in the radial gap between the shell surface and the bottom side of the head. The advantage of this embodiment is that the total number of elements that can be removed from the magazine is increased because the individual element heads are no longer separated from the carriers in the peripheral direction, and instead are partially overlapping.

In this case, an advantageous embodiment of the invention provides for the formation of a storage space for exactly one element in the peripheral direction between adjacent carriers. In the Z direction (the direction of the rotational axis of the cylinder), both adjacent carriers define a number of storage spaces which agree with the number of loops of the groove in the cylinder.

The carriers may be straight formed struts that are arranged parallel to the rotational axis near the shell surface. Alternatively, however, an alignment tilted toward the rotational axis or any desired curved or formed shape of any carrier may also be used. The struts may be arranged such that the impact of the individual elements takes place in precisely the longitudinal direction of the groove, that is, on the slope of the groove at a given point. Every carrier should impact the elements located within the groove across the entire axial range of the groove.

The individual carriers arranged in a cage may be connected together at the upper and/or lower cylinder end with a suitable flange construction in order to form the cage. A drive working with the flange construction may be used to cause the rotational movement of the cage relative to the cylinder.

A groove according to the invention may be configured such that the shaft of each element, or at least a part of it, is securely picked up. To this end, the width of the groove may be only slightly larger than that of the diameter of the shaft received by the groove so that the shaft is fed in the Z direction through the edges of the groove opposite each other. Also, the edges of the groove making up the shell surface of the cylinder, may run at a right angle to the direction of the rotational axis. A base of the groove may extend at a right angle to both of the oppositely positioned edges. Other forms for the groove edges are also possible within the scope of the present invention. The groove edges can be tilted toward the Z direction by sloping them down toward the rotational axis. With a vertically upright magazine, the shafts of the elements placed in it would then tilt slightly downward toward the rotational axis. This could hinder or prevent the elements from accidentally falling out.

In order to prevent the elements placed in the magazine from falling out in a radial direction from the groove, embodiments of the invention may include a mutual, preferably also cylinder-shaped retainer shell (or simply, retainer) surrounding the cylinder and the carrier. For this purpose, the internal radius of this retainer is selected slightly larger than the distance from the upper side of the head of an element sitting in the magazine to the rotational axis of the cylinder. In this case, the elements sitting in the magazine are positioned especially securely and precisely. The head of a respective element is guided in a radial direction toward the inside by the cylinder cover surface and to the outside by the inside of the retainer. In the peripheral direction, the head of the respective element is surrounded by adjacent carriers (or elements). In the Z direction, the edges of the groove opposite each other stabilize the element shaft.

As an alternative to a retainer located radially outside of heads of the elements held in the groove, the radial attachment of the elements can also be achieved with a magnetic strip arranged in the center of the cylinder in which the groove is formed. Where the elements or at least their shafts have suitable ferromagnetic properties this magnetic strip serves to pull the elements toward the interior of the cylinder and rotational axis by the magnetic force.

Embodiments of the present invention may include an ejection mechanism to remove or eject an element that has reached the outlet end of the groove. In some forms this ejection mechanism is activated with compressed air. For example, compressed air may be directed into a compressed air channel leading in to the groove in the area of the outlet end of the groove which grips the head of the element and then moves it radially to the outside. Other ejection mechanisms familiar to experts are likewise possible within the scope of the present invention. Any ejection mechanism may be synchronized with or even caused by the rotational motion of the cage. For example, a compressed air channel could be opened briefly and then closed again as part of a rotational cycle, for example with a mechanical means coupled with the rotary drive. A spring-loaded or other mechanical ejection arrangement can alternatively be linked with the rotary drive.

Embodiments of the invention may be configured such that elements are inserted serially into the groove at the start of input end of the groove and are moved according to the "first in-first out" principle along the groove to the outlet end of the groove. Multiple grooves may be arranged in the cylinder in an axial direction offset from each other in order to be able to store various types of elements in a magazine, each one behind the other. This variation is of interest for similar elements when multiple elements are to be output from the magazine at the same time as part of the manufacturing process for which the magazine is provided. Depending on the rotating position of the individual grooves with respect to each other and the resulting rotating position of the individual outlet ends of the grooves, similar or differing elements can be output at different starting positions for the magazine at the same time or at timed intervals, which correspondingly increases the flexibility of the magazine according to the invention.

A method for using a magazine according to the invention includes placing elements in the groove of the magazine with the shaft of each element extends into the groove while the head protrudes outward in a radial direction over the groove. The elements are then advanced along the groove and ultimately ejected at the outlet end of the groove. Methods according to the invention require comparably less space to individually store and output a large number of elements in a defined position.

In embodiments which include a number of carriers form a cage around the cylinder in which the groove is formed, methods within the scope of the invention may include advancing the elements along the groove by rotating the cage around the longitudinal axis of the cylinder as the cylinder remains motionless relative to the cage. At least one carrier thereby impacts a head or a section of the shaft protruding outward radially over the groove of at least one element in the peripheral direction and moves at least this one element along the groove as part of the rotating movement of the cage.

In order to be able to remove an element pushed forward to the outlet end of the groove or a following element pushed to the outlet end of the groove at regular intervals (cycled), methods according to the invention include rotating the cage at a constant angle of rotation around the rotational axis. All the elements located in the magazine and impacted by the carriers of the cage are thereby moved forward according to the angle of rotation along the groove in the direction toward the outlet end of the groove. For this purpose, the angle of rotation $\beta$ is derived from the number of carriers of the cage based on the formula $\beta=360°/n$.

In every cycle in which the elements arranged in the magazine are moved forward along the groove by the carrier of the cage, the elements shift in an axial direction a little bit closer to the end of the cylinder on which the outlet end of the groove is located. This axial path (z) traveled per cycle conforms with the slope P of the groove and the number (n) of the carriers of the cage evenly distributed around the cylinder based on the formula $z=P/n$.

While the magazine is preferably operated in cycles during normal operation in order to be able to output individual elements based on a specific time or location, the magazine in accordance with the invention can be easily loaded using the constant rotation of the cage relative to the cylinder. To do so, the first element is inserted into the groove starting end of the otherwise completely empty magazine. By rotating the cage relative to the cylinder, the element previously placed at the starting end of the groove is moved further along the groove such that the starting end of the groove is freed up for another element. By feeding elements one after another into the repeatedly emptied groove end, the elements intended for loading the magazine are inserted into the groove bit by bit and moved forward by the carrier of the cage. This can be done with a suitably designed feed-in using constant rotation of the cage around the cylinder, preferably also with a higher rpm in order to keep the loading time short.

The outlet end of the groove and/or the inlet end of the groove can be designed such that the groove opens to the upper or lower front side of the cylinder so that elements to be inserted or removed can be fed in an axial direction to the cylinder and/or removed from it. For the groove opening, this is suitable because otherwise this would result in feeding the individual elements while loading the magazine in a radial direction. The elements in this case need to be specifically fed spaced apart from each other in order to ensure that each element fed to the opening of the groove can be moved in the groove by a carrier out of the opening of the groove before the next element appears in a radial direction. In the front, however, the elements to be inserted could "appear" positioned close to each other in a row at the upper end of the groove and slide in one after the other once that end of the groove is free.

The elements that can be removed from the magazine, as previously mentioned, can specifically be fasteners such as screws, bolts, nails, etc. which have a shaft and a head. Since it is only significant for storage according to the invention that the head be wider than the shaft, other elements with such a shape can be considered for storage. For example, small containers, which have a volume enclosed in the shaft and are closed with a cover which is part of the head or forms the head, are suitable. This includes vials for which a screw cap protrudes radially over the circumference of the shaft formed by the body of the bottle. Capsules for coffee of other products also have a suitable form when the shaft area forms the actual container and the radially extended cover is the head. Magazines and methods according to the present invention are applicable, in principle, to any structure with a (shaft) section that can be placed in the suitably sized groove of the magazine and with a broader (head) section on one or both sides of the groove edges which can rest on the cylinder shell surface.

These and other advantages and features of the invention will be apparent from the following description of representative embodiments, considered along with the accompanying drawing.

DESCRIPTION OF REPRESENTATIVE EMBODIMENTS

Figure 1:
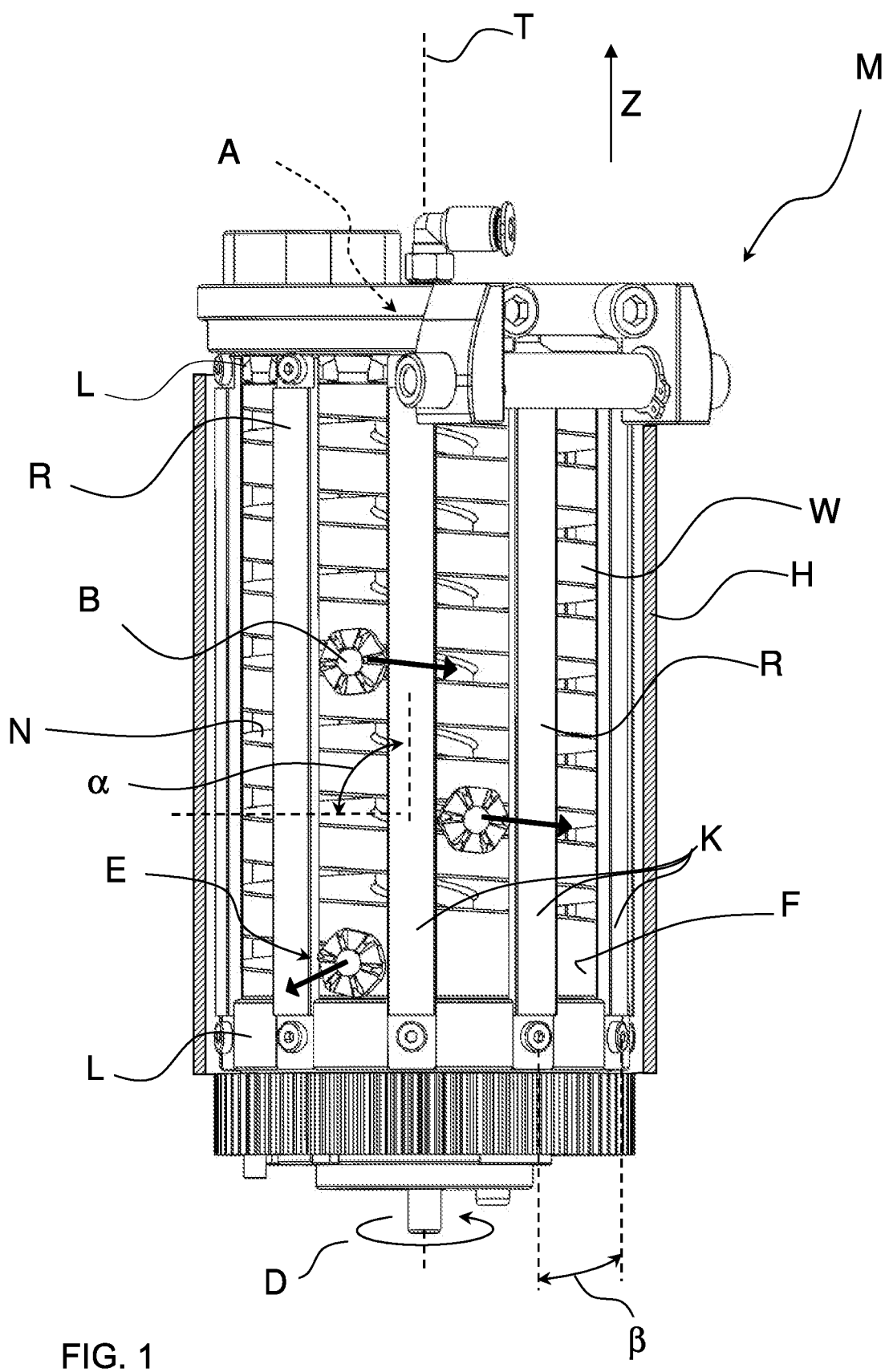
FIG. 1 shows a magazine according to an embodiment of the present invention oriented in a vertical direction.

The magazine M shown in FIG. 1 includes a cylinder W formed around a rotational axis T defining a shell surface F. A groove N is formed in the cylinder W and runs in a helical shape in direction Z around the rotational axis T. The slope of the groove N, that is, the angle of the groove N relative to a plane extending perpendicular to rotational axis T, is selected such that the groove N includes eight equal loops from one end of the cylinder W to the other.

At the upper end of cylinder W in the orientation of FIG. 1, the groove N terminates at a groove starting end A. Groove starting end A leads to the upper front surface of the cylinder W perpendicular to rotational axis T, and is obscured in FIG. 1 by structure at the upper end of cylinder W. At the lower end of the cylinder W shown in FIG. 1, groove outlet end E is formed. In the illustrated example of FIG. 1, groove outlet end E is obscured by the head of an element B.

The groove N is formed so that a variety of elements B can be stored. The elements B have a shaft (not shown) and a head which comprises the visible part of each element B shown in FIG. 1. A typical example of a suitable element would be a screw with a screw shaft and a screw head. The elements B are arranged in the groove N of cylinder W in such a way that the shaft is drawn in to the groove so that the shaft extends in a radial direction with respect to cylinder W (toward the rotational axis T) while the head, which is broader than the groove, cannot extend in to the groove N and instead rests with its bottom side facing the shell surface F of cylinder W.

Cylinder W is closely surrounded by a cage K which is primarily formed by a number of carriers R evenly arranged around the rotational axis T. The carriers R extend in this embodiment parallel to the rotational axis T and are connected together in a flange construction L essentially at each end of the cylinder W. The cage K in this form is mounted for rotation about axis T relative to the cylinder W. This rotation of cage K relative to cylinder W causes the carriers R to pass across the shell surface F of cylinder W around the entire periphery of the shell surface at the small radial intervals shown for example in FIG. 1.

The carriers R for the cage K are separated from each other about the periphery of the cage so that there is room between them for the head of element B, preferably without any significant extra space. For a cylinder W assumed as motionless, the movement of cage K around the rotational axis T results in a lateral impact to the elements B sitting between the carriers R in the groove N such that the elements B are then moved forward in the groove N according to speed of rotation of the cage K relative to the cylinder W.

For reasons of clarity, only a few elements B are shown in FIG. 1 with their (not visible) shafts extending into the groove N. Expediently, however, the magazine M can be filled completely in such a way that between the carriers R, all storage spaces available along groove N about the periphery of cylinder W are filled with elements B. A cylinder-shaped shell or retainer H covering cylinder W and cage K may be included with magazine M. Retainer H (which is shown in section in FIG. 1) may cover the cage K at a slight radial distance from the carriers R and the heads of elements B around the rotational axis T. The retainer H serves to stabilize the elements B in the radial direction to the outside and ensure against falling out of the desired position in the magazine with the element shaft extending into groove N.

Figure 2:
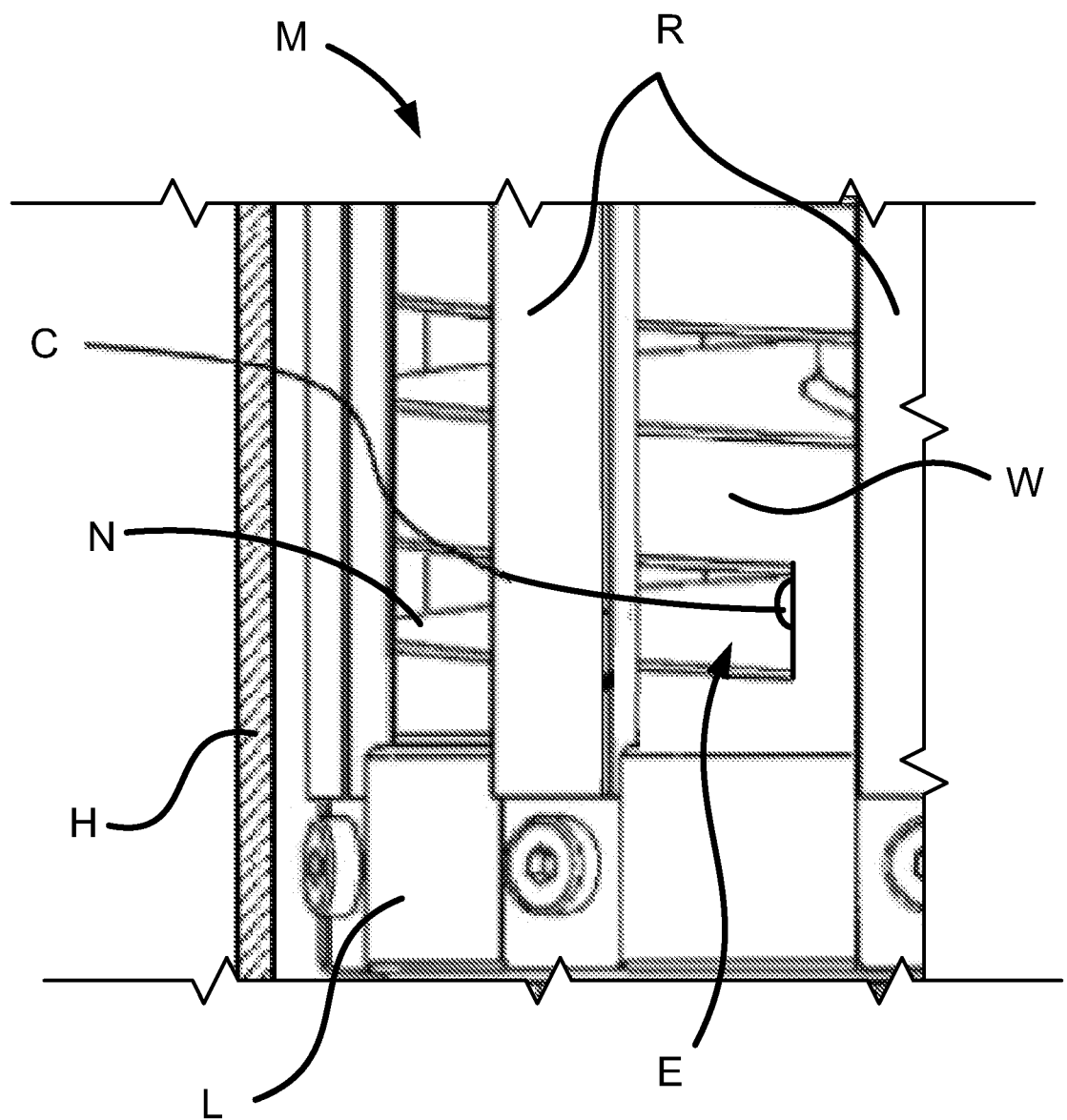
FIG. 2 is a somewhat enlarged view showing part of the magazine shown in FIG. 1 but with the fastener at the outlet end of the groove removed to expose part of an ejection mechanism.

FIG. 1 shows clearly that rotating cage K in direction of rotation D around the assumed motionless cylinder W results in the individual elements B inserted in the groove N being moved in the groove, whereby they move around the rotational axis T and at the same time are pushed downward in direction Z due to the slope of the helical-shaped groove. FIG. 1 illustrates the case in which a first element B has reached the groove outlet end E. In this position, the element B can be ejected from the groove outlet end E, for example with compressed air impact from a channel in the interior of cylinder W. A portion of an outlet C of such a compressed air channel is visible in FIG. 2. FIG. 2 shows a lower part of magazine M after compressed air has been applied through channel outlet C to eject the element B shown in the groove outlet end E in FIG. 1. Only after the element B has left groove outlet end E can cage K be rotated again in order to move the following next element B to the groove outlet end (such an immediately following element is not shown in FIG. 1; however it would be in a position between both carriers R at the very left in FIG. 1 in the lowest thread of groove N).

The elements B saved in magazine M can be fed consecutively in a cycle to groove end E by rotating cage K through a rotational angle about rotational axis T in the direction of rotation D (rotation to the right in the orientation of FIG. 1). The rotational angle required for this β results from the number (n) of the carriers R arranged evenly around the cylinder W, divided by 360°. The cage K can be rotated with a drive (not shown) which could, for example, engage with one of the flanges L provided with a spur wheel or gear (not called out in the figures). Alternatively, the timed continued rotation of the cage K may also be implemented with a pneumatic drive which converts the linear motion of a pneumatic cylinder into a rotational motion transferred to cage K.

To load an empty magazine M with elements B the cage K is rotated such that the groove starting end A (covered in FIG. 1 by a portion of flange L at the upper end of cylinder W) lies in the peripheral direction around cylinder W between two adjacent carriers R. Then a first or initial element B can be inserted into the groove starting end A, for example from a feed-in direction, into which the element B can be serially supplied. As the cage K is rotated, the carrier R positioned behind the groove starting end A impacts the element inserted at that location and moves the element further down the groove away from the groove starting end A. Once that impacting carrier R completely passes the groove starting end A so that the end is once again exposed between adjacent carriers R, the next element B may then be inserted in a similar manner into the groove starting end A, and this newly inserted element B can be further transported along groove N with further rotation of the cage K. This loading procedure can be done as part of a continuous rotation of cage K around the rotational axis T by having elements B to be loaded in to magazine M available above the groove starting end A and then inserting them unassisted or with mechanical assistance into the groove starting end once it is empty again. This operation allows the magazine M to be filled entirely in a short amount of time. The filling procedure ends once the first inserted element B has reached the groove outlet end E.

In some applications a magazine M may not be entirely emptied as part of a manufacturing process before it is to be refilled again. In these cases, the cage K can be turned back opposite to the direction of rotation D far enough until the last inserted element B has reached the position immediately adjacent to the groove starting end A. In this way all elements B arranged in the magazine are therefore moved upward (in the orientation of the figures) toward the groove starting end A, instead of downward to the groove outlet end E. By then filling the magazine in the manner previously described, the magazine M is filled without interruption. With suitable detectors (not shown) arranged on magazine M, it can be determined whether and how many elements B are in the magazine M. For seamless refilling and logging of the individual cage K rotation cycles, the filling volume of the magazine can be determined without sensors as well.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A magazine for storing multiple elements which each have a respective shaft and a respective head, the magazine including:
    (a) a cylinder defining a shell surface extending about a rotational axis;
    (b) a groove formed in the shell surface and extending in a helical shape along the shell surface from a groove starting end in multiple loops about the rotational axis to a groove outlet end;
    (c) the groove having a width and depth sufficient to receive the shaft of each respective element therein in a position in which the respective shaft extends toward the interior of the cylinder while the respective head, having a cross-sectional dimension larger than the width of the groove, protrudes from the groove radially outwardly with respect to the rotational axis; and
    (d) at least one carrier mounted for rotation about the rotational axis in position to contact a respective element and slide the respective element along the groove.

2. The magazine of claim 1 further including a retainer surrounding the cylinder and each carrier, the retainer being in position to prevent the elements positioned in the groove from falling out of the groove in a radial direction relative to the rotational axis.

3. The magazine of claim 1 further including a number of carriers evenly distributed around the rotational axis so as to form a cage mounted for rotation around the rotational axis.

4. The magazine of claim 3 wherein the number of carriers provides a separation between adjacent carriers in the cage sufficient to accept no more than one element head or element shaft in a direction of rotation about the rotational axis.

5. The magazine of claim 3 wherein each carrier extends along the entire axial length of the groove along the rotational axis.

6. The magazine of claim 3 wherein each set of two adjacent carriers form a number of individual element storage spaces between them along the rotational axis, the number of individual element storage spaces being equal to the number of loops of the groove.

7. The magazine of claim 1 wherein the groove has an edge oriented to the rotational axis so as to form an angle greater than zero degrees and less than or equal to ninety degrees.

8. The magazine of claim 1 further including an ejection mechanism for ejecting a respective element received in the groove at the groove outlet end.

9. A method for storing a number of elements which each have a respective shaft and a head, the method including:
    (a) storing a first element of the number of elements in a stored position at a first location of a groove formed in a shell surface defined about a rotational axis, the groove having a width which allows the shaft of the first element to pass therethrough and prevent the head of the first element from passing therethrough, the groove extending in a helical shape along the shell surface from a groove starting end through multiple loops about the rotational axis to a groove outlet end, wherein in the stored position at the first location of the groove the shaft of the first element is received in the groove while the head of the first element protrudes from the groove radially outwardly with respect to the rotational axis;
    (b) storing at least one additional element of the number of elements in a stored position at a respective additional location of the groove, wherein in the stored position at the respective additional location of the groove the shaft of the respective additional element is received in the groove while the head of the respective additional element protrudes from the groove radially outwardly with respect to the rotational axis; and
    (c) moving a carrier about the rotational axis to contact the first element or a respective additional element and push the contacted first element or additional element along the groove while the shaft of the contacted first element or additional element remains received in the groove.

10. The method of claim 9 wherein the carrier is one of a number of carriers that together form a cage in which the number of carriers are evenly distributed around the shell surface and wherein rotating the cage about the rotational axis moves each of the number of carriers about the rotational axis.

11. The method of claim 10 wherein adjacent carriers of the cage:
    (a) are spaced apart about the rotational axis to accept no more than one of the number of elements there between; and
    (b) extend in the direction of the rotational axis sufficiently to accept multiple elements of the number of elements there between in the direction of the rotational axis.

12. The method of claim 10 wherein the cage is rotated in cycles about the rotational axis, each cycle comprising a defined angle of rotation about the rotational axis such that in each cycle all elements in a respective stored position are moved in the groove and exactly one element is placed at the groove outlet end in position to be ejected from the groove, the defined angle of rotation being equal to 360° divided by the number of carriers included in the cage.

13. The method of claim 10 wherein the first location of the groove is at the groove starting end and wherein rotating the cage about the rotational axis through a first rotational angle causes a respective one of the carriers to convey the first element along the groove away from the groove starting end and cause the respective carrier to completely pass the groove starting end so that the groove starting end is exposed to receive one of the number of elements, and further including:
  (a) placing a respective additional element of the number of elements in the stored position at the groove starting end;
  (b) rotating the cage further about the rotational axis through and additional rotational angle sufficient to (i) cause an additional one of the carriers to contact the respective additional element in the stored position at the groove starting end and convey the respective additional element along the groove away from the groove starting end and to (ii) cause the additional one of the carriers to completely pass the groove starting end so that the groove starting end is exposed to receive another additional element of the number of elements; and
  (c) repeating steps (a) and (b) of this claim for each respective other additional element to be stored.

\* \* \* \* \*